US012700291B2

(12) United States Patent
Halling et al.

(10) Patent No.: US 12,700,291 B2
(45) Date of Patent: Aug. 4, 2026

(54) SYSTEM AND A METHOD FOR COLLISION AND INTRUSION DETECTION OF A DOOR

(71) Applicant: Assa Abloy Entrance Systems AB, Landskrona (SE)

(72) Inventors: Lars Halling, Bunkeflostrand (SE); Tomas Jonsson, Ronninge (SE); Lars Lindroth, Stockholm (SE); Annea Barkefors, Nacka (SE); Anders Sahlstrom, Stockholm (SE); Marcus Trulsson, Arsta (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 21 days.

(21) Appl. No.: 18/857,232

(22) PCT Filed: Apr. 18, 2023

(86) PCT No.: PCT/EP2023/059994
§ 371 (c)(1),
(2) Date: Oct. 16, 2024

(87) PCT Pub. No.: WO2023/203021
PCT Pub. Date: Oct. 26, 2023

(65) Prior Publication Data

US 2025/0265914 A1 Aug. 21, 2025

(30) Foreign Application Priority Data

Apr. 19, 2022 (SE) .................................... 2230113-9

(51) Int. Cl.
*G08B 13/08* (2006.01)
*G08B 13/16* (2006.01)

(52) U.S. Cl.
CPC ......... *G08B 13/08* (2013.01); *G08B 13/1654* (2013.01)

(58) Field of Classification Search
None
See application file for complete search history.

(56) References Cited

U.S. PATENT DOCUMENTS 4,711,754 A * 12/1987 Bednar .................. G01M 7/08 976/DIG. 207
5,929,580 A 7/1999 Mullet
(Continued)

FOREIGN PATENT DOCUMENTS

EP 3582196 12/2019
KR 20150026636 3/2015

OTHER PUBLICATIONS

Swedish Search Report for application No. 2230113-9, dated Apr. 19, 2022.

*Primary Examiner* — Carlos Garcia
(74) *Attorney, Agent, or Firm* — Wissing Miller LLP

(57) ABSTRACT

The disclosure relates to a system (100) for collision and intrusion detection of a door (1), the system (100) comprises a movement sensor (10*a*, 10*b*) configured to be arranged at the door (1) to detect movement of the door (1), a processing circuitry (102*a*, 102*b*, 102*c*) configured to cause the system (100) to obtain, by the movement sensor (10*a*, 10*b*), movement data indicative of a movement of the door (1), analyze the movement of the door (1) during a predefined time period based on the obtained movement data, and utilize a movement-to-event model to determine a probable event that caused the movement of the door (1). The disclosure further relates to a method for collision and intrusion detection of a door (1) and a computer program product (500).

14 Claims, 7 Drawing Sheets

(56) References Cited

U.S. PATENT DOCUMENTS

| | | | | |
|---|---|---|---|---|
| 6,161,438 | A | 12/2000 | Mullet | |
| 6,326,751 | B1 | 12/2001 | Mullet | |
| 10,600,316 | B1 * | 3/2020 | Dziduch | G08B 31/00 |
| 2001/0047213 | A1 | 11/2001 | Sepe | |
| 2004/0032232 | A1 | 2/2004 | Murray | |
| 2014/0331557 | A1 * | 11/2014 | Bruns | E05F 15/603 49/506 |
| 2021/0389172 | A1 | 12/2021 | Jonsson | |

* cited by examiner

SYSTEM AND A METHOD FOR COLLISION AND INTRUSION DETECTION OF A DOOR

This application is a 371 of PCT/EP2023/059994, filed on Apr. 18, 2023, published on Oct. 26, 2023, under publication number WO 2023/203021, which claims priority benefits from Swedish Patent Application No. 2230113-9, filed on Apr. 19, 2022, the disclosure of each of which are incorporated herein by reference.

TECHNICAL FIELD

The present disclosure relates to a system for collision and intrusion detection of a door, a method for collision and intrusion detection of a door and a computer program product.

BACKGROUND ART

Doors are used in a variety of locations and they enable entrance to buildings and protect buildings and property from e.g. weather and intrusion. It is important to maintain continuous operation of a door and secure that the door is functioning well. Sometimes there is a disruption in the operation of a door due to e.g. that the door has been damaged due to external influence of some kind.

It can e.g. be that the door has been hit by a vehicle and therefore is malfunctioning. This can happen e.g. to an industrial door at a logistics center, a forklift or a truck can by accident hit the door, which can then be damaged or not function as it normally does.

A door can also be manipulated by an intruder. An intrusion attempt can damage the door, and it can also lead to an undesired entrance to unwanted persons to a building.

Today doors are manually inspected in order to detect if a door has been damaged e.g. hit by a vehicle or damaged by an intruder.

Normal operation of the door is desired and it is therefore important to maintain the door in an operable condition and understand as early as possible if the door has been damaged. A non-functioning door can e.g. cause an obstacle in accessing a building or a warehouse, which in turn can cause a delay or hinder in e.g. logistics of goods and have a negative impact on a business, energy consumption, in-house climate or just cause irritation. A non-functioning door can also be a safety issue.

There is a desire to shorten downtime of operation of a door, and there is also a desire to detect intrusion or vandalism of a door as soon as possible.

SUMMARY

It is an object of the present disclosure to mitigate, alleviate or eliminate one or more of the above-identified deficiencies and disadvantages in the prior art and solve at least the above mentioned problem.

According to a first aspect there is provided a system for collision and intrusion detection of a door. The system comprises a movement sensor configured to be arranged at the door to detect movement of the door. The system further comprises a processing circuitry configured to cause the system to obtain, by the movement sensor, movement data indicative of a movement of the door, analyze the movement of the door during a predefined time period based on the obtained movement data, and utilize a movement-to-event model to determine a probable event that caused the movement of the door.

An advantage with this aspect is that by analyzing the movement of the door, a probable event causing the movement can be determined, and the information regarding the probable event can in turn be used to take actions that relates to the operation of the door in order to secure operation and protect the door.

According to some embodiments, the movement-to-event model is based on known movements of the door linked to known events.

An advantage with this embodiment is that the movement-to-event model is used to analyze and compare the obtained movement data indicative of the movement of the door, with plural known movement data indicative of a movements of doors that are linked to known events, in order to determine the probable event that caused the movement of the door.

According to some embodiments, the processing circuitry is further configured to determine a movement pattern describing the movement of the door during the predefined time period and wherein the movement-to-event model is comparing the determined movement pattern describing the movement of the door with known movement patterns describing different movements of the door caused by known events.

An advantage with this embodiment is that the movement-to-event model can be used to analyze and compare the movement pattern describing the movement of the door with plural known movement patterns that are linked to known events, in order to determine the probable event that caused the movement pattern of the door.

According to some embodiments, the processing circuitry is further configured to, cause the system to control operation of the door based on the probable event that caused the movement of the door.

An advantage with this embodiment is that the door can be operated in different ways dependent on what probable event that has occurred in order to maintain safety and reduce possible damage of the door.

According to some embodiments, the processing circuitry is further configured to, cause the system to determine a position of the door when the probable event that caused the movement of the door occurred.

An advantage with this embodiment is that it can be determined what may have caused the movement of the door and to determine possible damage of the door.

According to some embodiments, the movement data indicative of a movement of the door is indicative of a movement in at least a first direction in relation to the door.

An advantage with this embodiment is that movement data indicative of a movement of the door can be obtained in one or plural dimensions in relation to the door and the determination of the probable event that caused the movement of the door can utilize the movement data indicative of movement in one or plural dimensions.

According to some embodiments, the movement of the door during the predefined time period is described by a function describing a movement amplitude in at least a first direction in relation to the door over time.

An advantage with this embodiment is that the function describing the movement amplitude can be utilized by the movement-to-event model to determine a probable event that caused the movement of the door.

According to some embodiments, an impact movement energy, causing the movement of the door during the predefined time period, is determined by calculating the surface area under the function describing the movement amplitude in the at least first direction in relation to the door over time.

An advantage with this embodiment is that the determined impact movement energy can be utilized by the movement-to-event model to determine a probable event that caused the movement of the door.

According to some embodiments, the movement-to-event model is trained based on historical event data and/or user input data by using artificial intelligence models and/or statistical models.

An advantage with this embodiment is that the movement-to-event model can be improved over time in order to improve the determination of the probable event that caused the movement of the door.

According to some embodiments, the system further comprises a motor arranged at the door configured to control operation of the door.

According to some embodiments the movement sensor is further configured to detect movement or vibration of the door caused by frequencies generated by the motor, and in accordance with a determination of a probable event, the processing circuitry is further configured to determine a change in the amplitude of the frequencies generated by the motor to predict maintenance of the door.

An advantage with this embodiment is that in a determination of a probable event it can be further determined if the operation of the motor has changed, which can be an indication of that maintenance of the door is needed or not needed dependent on the determination of change in the amplitude of the frequencies generated by the motor after the probable event has occurred.

According to some embodiments, the system further comprises a camera configured to capture and store, in a circular memory of the camera, a footage of the door environment for a set time duration.

According to some embodiments, the camera is configured to capture and store the footage of the door environment in real time.

According to some embodiments, the circular memory of the camera is an internal memory of the camera. Additionally, or alternatively, the circular memory of the camera is operatively connected to the camera, and/or the processing circuitry.

According to some embodiments, the circular memory of the camera is operatively connected to a memory operatively connected to the processing circuitry.

According to some embodiments, the circular memory of the camera is the same as the memory operatively connected to the processing circuitry.

According to some embodiments, the footage is a video of the door and/or door environment.

According to some embodiments the set time duration is preferably 5-60 seconds, more preferably 10-50 seconds, most preferably 30 seconds.

According to some embodiments, upon detection of movement of the door by the movement sensor, the stored footage of the door environment is stored in the memory operatively connected to the processing circuitry.

According to some embodiments, wherein when the probable event is determined to be caused by an external force, the stored footage of the door environment is stored in the memory operatively connected to the processing circuitry.

According to a second aspect there is provided a method for collision and intrusion detection of a door, the method comprising obtaining, by the movement sensor, movement data indicative of a movement of the door, analyzing the movement of the door during a predefined time period based on the obtained movement data, and utilizing a movement-to-event model to determine a probable event that caused the movement of the door.

An advantage with this aspect is that by analyzing the movement of the door, a probable event causing the movement can be determined, and the information regarding the probable event can in turn be used to take actions that relates to the operation of the door in order to secure operation and protect the door.

According to some embodiments, the method further comprises determining, if the movement of the door is above a predefined threshold value based on the obtained movement data.

An advantage with this aspect is that if the movement of the door is below a predefined threshold value, the movement of the door is ignored.

According to some embodiments, the method further comprises determining a movement pattern describing the movement of the door during the predefined time period and wherein the movement-to-event model is comparing the determined movement pattern describing the movement of the door with known movement patterns describing different movements of the door caused by known events.

An advantage with this embodiment is that the movement-to-event model can be used to analyze and compare the movement pattern describing the movement of the door with plural known movement patterns that are linked to known events, in order to determine the probable event that caused the movement pattern of the door.

According to some embodiments, the method further comprises controlling operation of the door based on the probable event that caused the movement of the door.

An advantage with this embodiment is that the door can be operated in different ways dependent on what probable event that has occurred in order to maintain safety and reduce possible damage of the door.

According to some embodiments, the method further comprises determining a position of the door when the probable event that caused the movement of the door occurred.

An advantage with this embodiment is that it can be determined what may have caused the movement of the door and to determine possible damage of the door.

According to a third aspect there is provided a computer program product comprising a non-transitory computer readable medium, having thereon a computer program comprising program instructions, the computer program being loadable into a processing circuitry and configured to cause execution of the method when the computer program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 1 illustrates a system for collision and intrusion detection of a door, according to an embodiment of the present disclosure.

FIG. 2*a* illustrates an example of collision detection when the door is hit by a truck.

FIG. 2*b* illustrates an example of intrusion detection when the door is manipulated by a person.

FIG. 3*a* illustrates an example acceleration over time graph when the door hit by a truck.

FIG. 3*b* illustrates an example acceleration over time graph when the door hit by a ball.

FIG. 4*a* illustrates an example of obtained movement data of a detected movement of the door.

FIG. 4*b* illustrates an example of movement data of a first known movement of the door linked to a first known event.

FIG. 4*c* illustrates an example of movement data of a second known movement of the door linked to a second known event.

FIG. 5*a* illustrates a first example of impact movement energy, causing the movement of the door.

FIG. 5*b* illustrates a second example of impact movement energy, causing the movement of the door.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
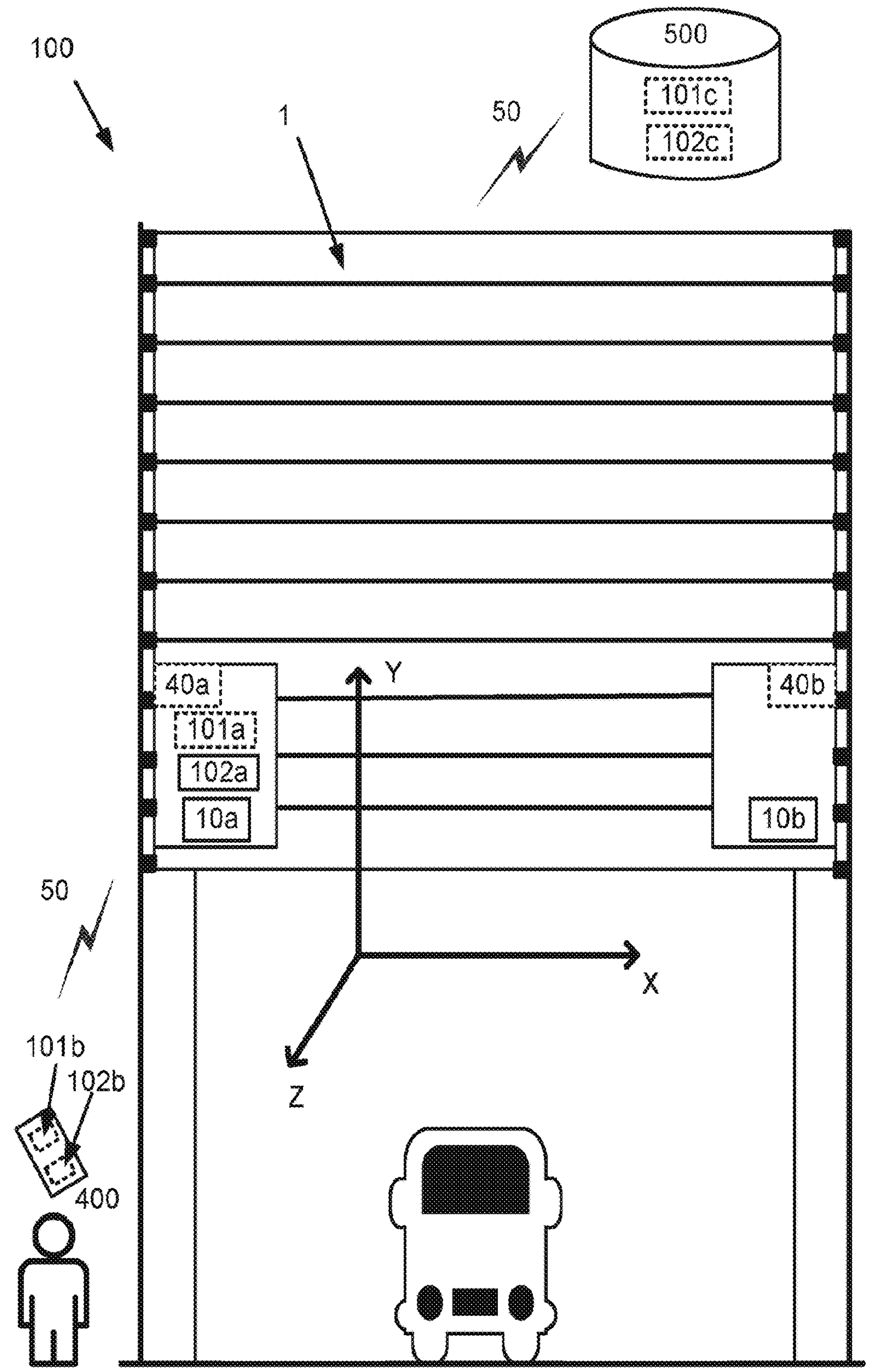

FIG. 1 illustrates a system for collision and intrusion detection of a door 1, according to an embodiment of the present disclosure.

In the example illustration in FIG. 1, the door 1 is an overhead sectional door, e.g. a door 1 to a warehouse or logistics center.

It is understood that system 100 for collision and intrusion detection of a door 1 can be configured for collision and intrusion detection of any type of door. In an example the door 1 is a pedestrian door, e.g. an entrance door at a building such as a hotel, an office or a home.

According to some embodiments the door 1 is any of a revolving door, a slider door, a hangar door, a sliding door, a swing door, an overhead sectional door, a folding door, a vertical-lifting door, a high speed door, a garage door, a pedestrian door, an overhead sectional door and a mega door.

The first aspect of this disclosure shows a system 100 for collision and intrusion detection of a door 1. The system 100 comprises a movement sensor 10*a*, 10*b* configured to be arranged at the door 1 to detect movement of the door 1.

According to some embodiments the system 100 comprises plural movement sensors 10*a*, 10*b* configured to be arranged at the door 1 to detect movement of the door 1. According to some embodiments the plural movement sensors 10*a*, 10*b* are configured to be connected and configured to cooperate in order to detect movement of the door 1.

In the illustration in FIG. 1 the two movement sensors 10*a*, 10*b* are arranged at different corners of the door 1, that is an overhead sectional door. The movement sensor 10*a*, 10*b* can however be arranged anywhere at the door.

An advantage with plural movement sensors 10*a*, 10*b* is that the system becomes more robust with respect to redundancy, and another advantage is that the detection of the movement of the door can be more precise.

The system 100 comprises a processing circuitry 102*a*, 102*b*, 102*c*. According to some embodiments the processing circuitry 102*a* is arranged at the door 1. In the illustration in FIG. 1 the processing circuitry 102*a* is arranged at the door 1 together with the movement sensor 10*a*.

According to some embodiments the processing circuitry 102*b* is comprised in a portable electronic device 400 operatively connected to the movement sensor 10*a*, 10*b* via a communication network 50.

According to some embodiments the processing circuitry 102*c* is comprised in a remote stationary electronic device 500 operatively connected to the movement sensor 10*a*, 10*b* via the communication network 50.

According to some embodiments the system 100 comprises a memory 101*a*, 101*b*, 101*c*. According to some embodiments the memory 101*a*, 101*b*, 101*c* is operatively connected to the processing circuitry 102*a*, 102*b*, 102*c*.

According to some embodiments the memory 101*a* is arranged at the door 1. In the illustration in FIG. 1 the memory 101*a* is arranged at the door 1 together with the processing circuitry 102*a* and the movement sensor 10*a*.

According to some embodiments the memory 101*b* is comprised in a portable electronic device 400 operatively connected to the processing circuitry 102*b* in the portable electronic device 400 or operatively connected to the processing circuitry 102*a*, 102*c* via the communication network 50.

According to some embodiments the memory 101*c* is comprised in a remote stationary electronic device 500 operatively connected to the processing circuitry 102*c* in the remote stationary electronic device 500 or operatively connected to the processing circuitry 102*a*, 102*c* via the communication network 50.

According to some embodiments the communication network 50 is a wireless communication network.

According to some embodiments the wireless communication network is a standardized wireless local area network such as a Wireless Local Area Network, WLAN, Bluetooth™, ZigBee, Ultra-Wideband, UWB, Radio Frequency Identification, RFID, or similar network.

According to some embodiments the wireless communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network.

According to some embodiments the wireless communication network can also be a combination of both a wireless local area network and a wireless wide area network.

According to some embodiments communication network 50 can be a combination a wired communication network and a wireless communication network. According to some embodiments the communication network 50 is defined by common Internet Protocols.

The processing circuitry 102*a*, 102*b*, 102*c* is configured to cause the system 100 to obtain, by the movement sensor 10*a*, 10*b*, movement data indicative of a movement of the door 1, analyze the movement of the door 1 during a predefined time period based on the obtained movement data, and utilize a movement-to-event model to determine a probable event that caused the movement of the door 1.

An advantage with this aspect is that by analyzing the movement of the door 1, a probable event causing the movement can be determined, and the information regarding the probable event can in turn be used to take actions that relates to the operation of the door 1 in order to secure operation and protect the door 1.

It is understood that the probable event can be a variety of events, and not limited to collision and intrusion events. According to some embodiments the probable event is any event caused by external influence of the door 1. In an example movement of the door can be caused by weather, animals, humans, machines, objects, etc.

Figure 2A:
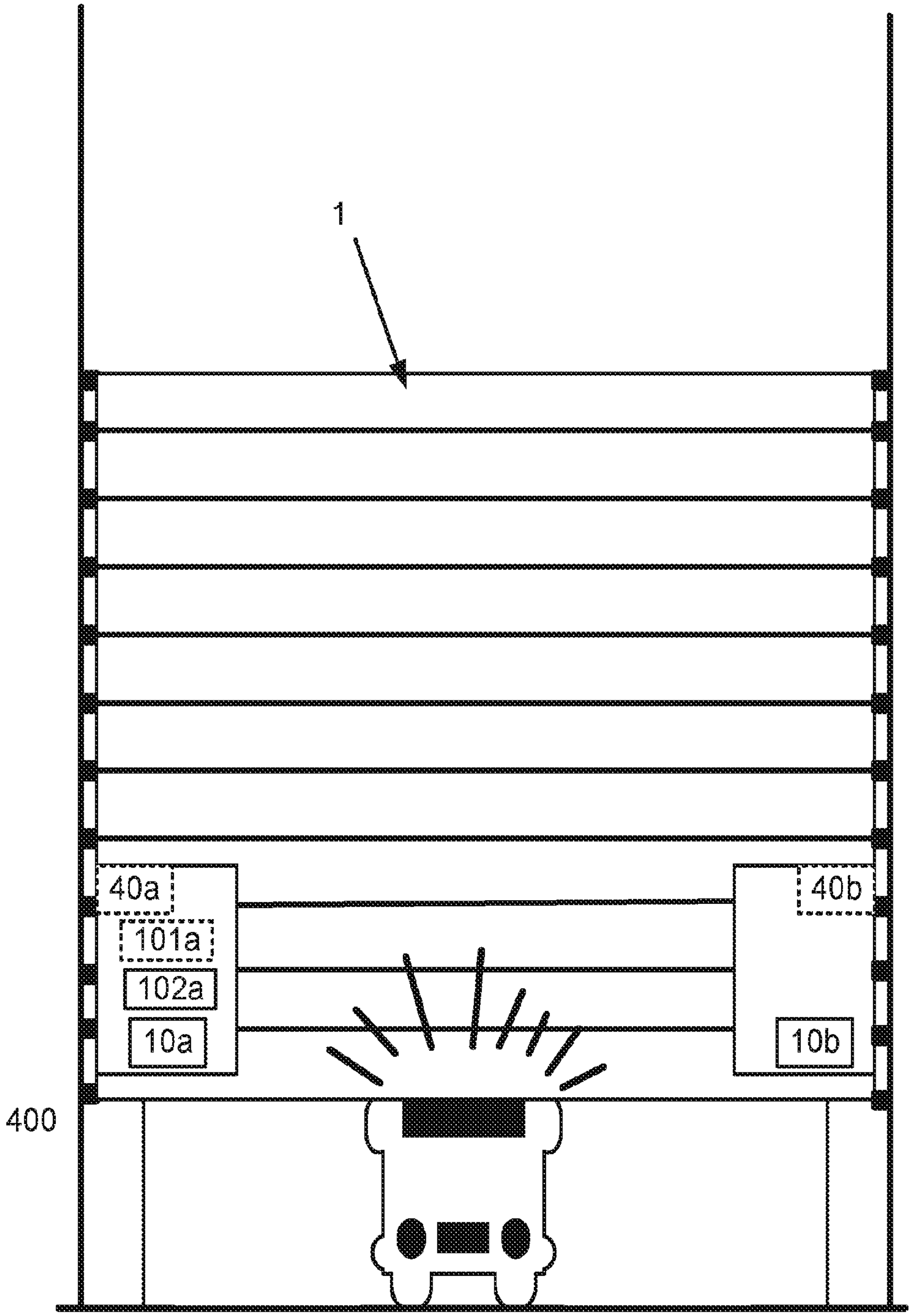

FIG. 2*a* illustrates example of collision detection when the door 1 is hit by a truck. In the example illustration in FIG. 2*a* the door 1 is an overhead sectional door, and the door 1 is hit by the truck when the door 1 is between closed and fully opened position at a certain height above the ground. In the example the door 1 is hit by a truck, there are however plural other collisions that are possible including the example that the door 1 is hit by a forklift which is unfortunately quite common.

Figure 2B:
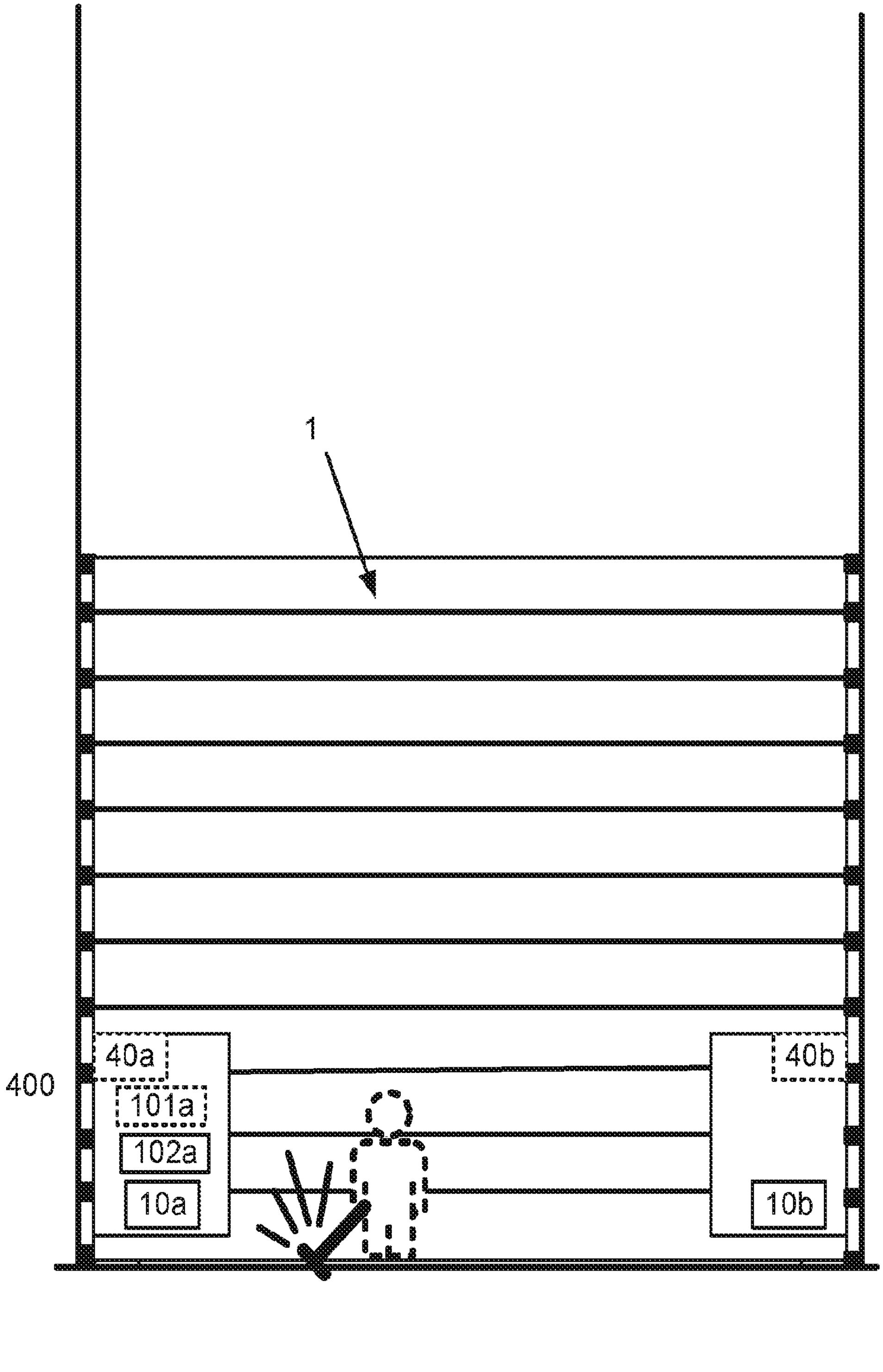

FIG. 2*b* illustrates example of intrusion detection when the door is manipulated by a person. In the example illustration in FIG. 2*b* the door 1 is an overhead sectional door, and the door 1 is manipulated by an intruder from the outside of the door 1 by a crowbar when the door 1 is in a closed position.

According to some embodiments the movement data indicative of a movement of the door 1 is indicative of a movement in at least a first direction x, y, z in relation to the door 1. An advantage with this embodiment is that movement data indicative of a movement of the door 1 can be obtained in one or plural dimensions in relation to the door 1 and the determination of the probable event that caused the movement of the door can utilize the movement data indicative of movement in one or plural dimensions.

FIG. 1 illustrates three directions x, y, z. In the illustration the direction x is parallel to the plane defined by the surface of the door 1 in a first direction, and the direction y is parallel to the plane defined by the surface of the door 1 in a second direction, and the direction z is perpendicular to the plane defined by the surface of the door 1.

In the example illustration in FIG. 2*a* when the door 1 is hit by the truck, the event causes movements of the door 1. In an example when the door 1 is hit by the truck, the event causes movements of the door 1 in three directions x, y, z in relation to the door 1. The movement sensor 10*a*, 10*b* is configured to detect movement of the door 1 and according to one embodiment movement data indicative of the movement of the door comprises measurement of the acceleration of the door 1 in the three directions x, y, z in relation to the door 1.

According to some embodiments only movement data indicative of a movement of the door 1 in one direction in relation to the door 1 is used for determining the probable event that caused the movement of the door 1.

According to some embodiments movement data indicative of a movement of the door 1 the direction perpendicular to the plane defined by the surface of the door 1 used for determining the probable event that caused the movement of the door 1.

In the example as illustrated in FIG. 2*a* when the door 1 is hit by the truck, only movement data indicative of a movement of the door 1 in the direction perpendicular to the plane defined by the surface of the door 1 is used for determining the probable event that caused the movement of the door 1.

In the example as illustrated in FIG. 2*b* when the door 1 is manipulated by an intruder from the outside of the door 1 by a crowbar, only movement data indicative of a movement of the door 1 in the second direction y that is parallel to the plane defined by the surface of the door is used for determining the probable event that caused the movement of the door 1.

Figure 3A:
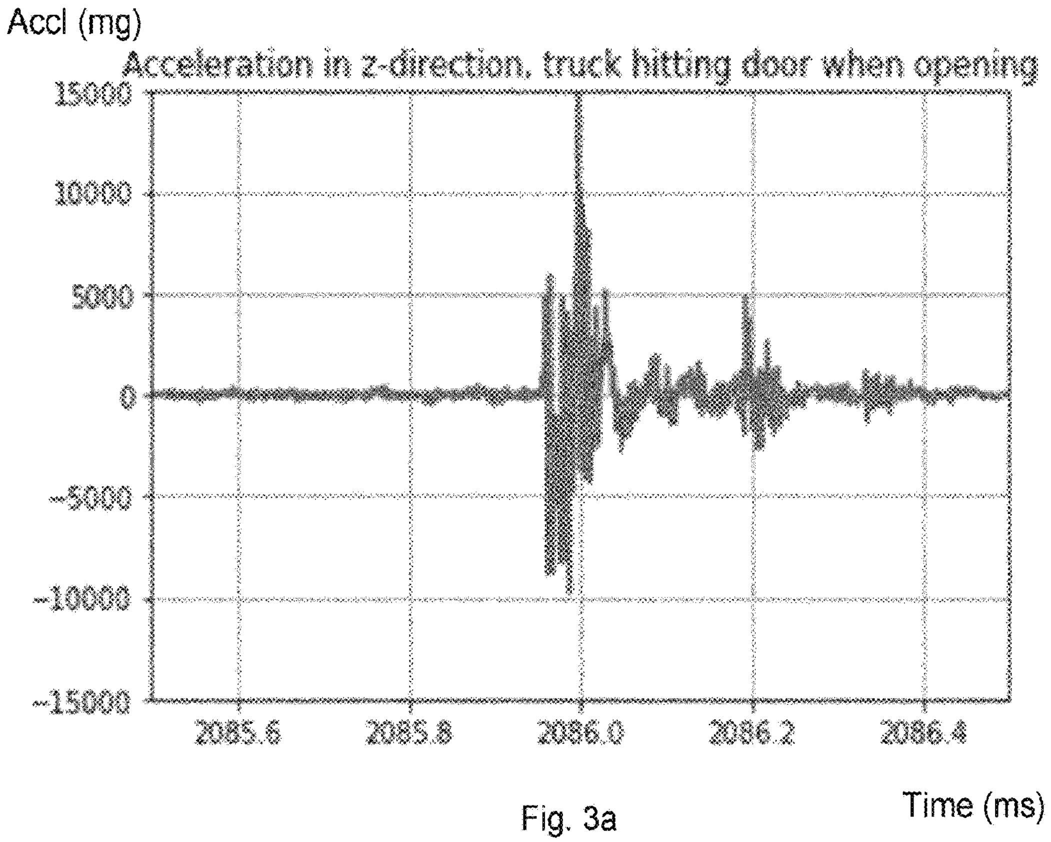

FIG. 3*a* illustrates example acceleration over time graph when the door 1 hit by a truck. In FIG. 3*a*, the movement data indicative of the movement of the door 1 comprises measurement of the acceleration of the door 1 the z direction that is the direction that is perpendicular to the plane defined by the surface of the door 1. The FIG. 3*a* illustrates acceleration, measured in acceleration force, mg, over time, in milliseconds, ms. In the example illustration of FIG. 3*a* the predefined time period is between 2085.5 ms and 2086.5 ms.

Figure 3B:
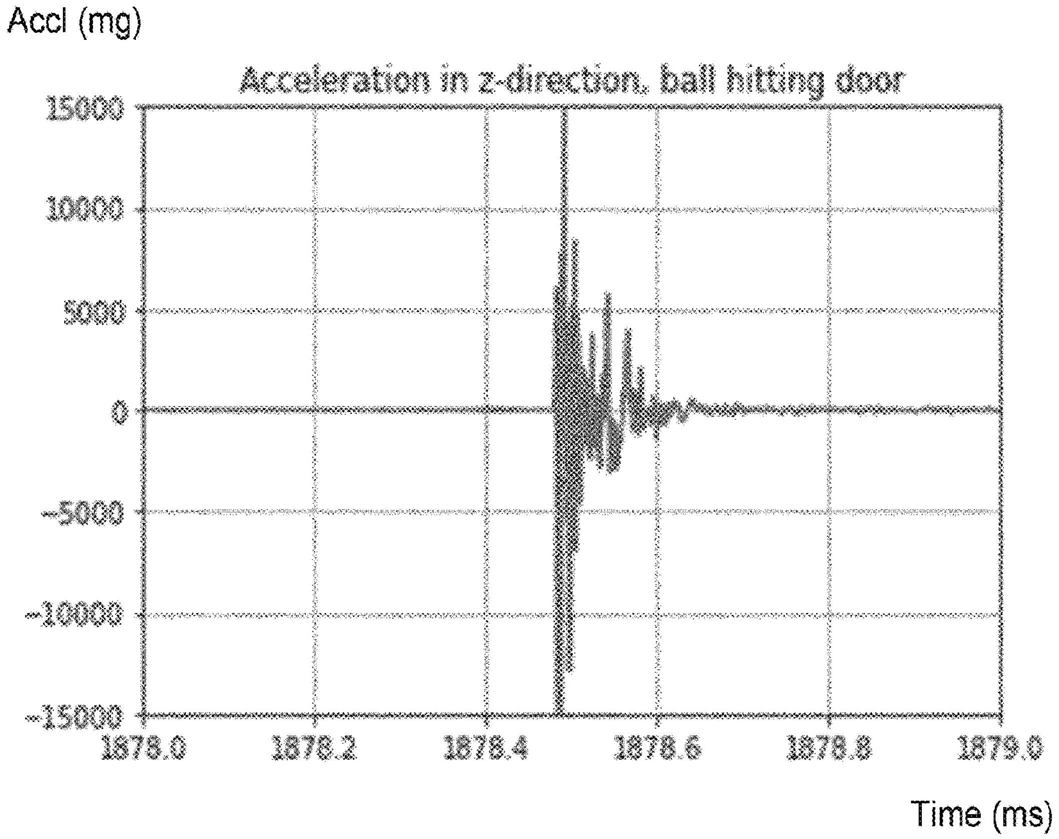

FIG. 3*b* illustrates example acceleration over time graph when the door hit by a ball. In FIG. 3*b*, the movement data indicative of the movement of the door 1 comprises measurement of the acceleration of the door 1 the z direction that the direction that is perpendicular to the plane defined by the surface of the door 1. The FIG. 3*b* illustrates acceleration, measured in acceleration force, mg, over time, in milliseconds, ms. In the example illustration of FIG. 3*b* the predefined time period is between 1870.0 ms and 1879.0 ms.

According to some embodiments the movement-to-event model is based on known movements of the door 1 linked to known events.

According to some embodiments movement data indicative of known movements of the door 1 linked to known events are stored in the memory 101*a*, 101*b*, 101*c*.

According to some embodiments the movement-to-event model is utilizing stored movement data indicative of known movements of the door 1 linked to known events to determine a probable event that caused the movement of the door 1.

According to some embodiments the movement-to-event model is comparing the obtained movement data indicative of a movement of the door 1 with stored movement data indicative of known movements of the door 1 linked to known events, to determine a probable event that caused the movement of the door 1.

Figure 4A:
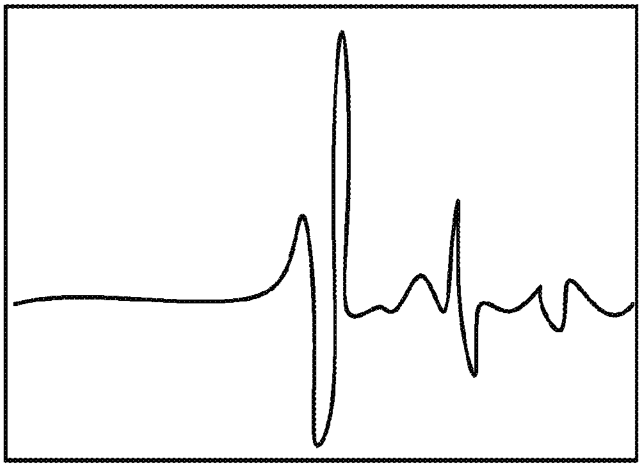

FIG. 4*a* illustrates an example of obtained movement data of a detected movement of the door. According to some embodiments the movement data of the detected movement of the door comprising an acceleration over time function.

Figure 4B:
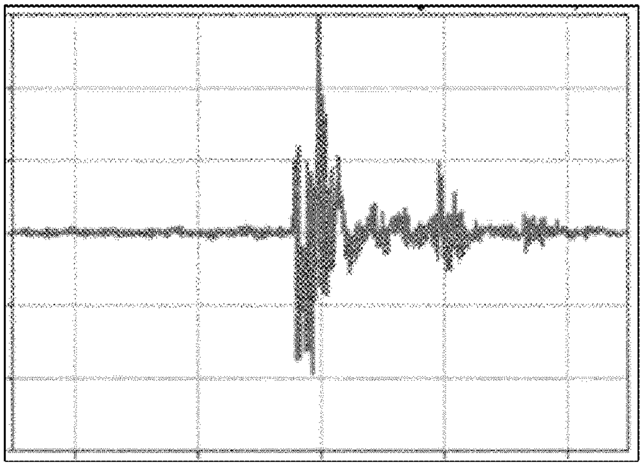

FIG. 4*b* illustrates an example movement data of a first known movement of the door linked to a first known event. According to some embodiments the movement data of the first known movement of the door comprising an acceleration over time function. In the example illustration in FIG. 4*b* the known event is collision detection when the door 1 is hit by a truck.

Figure 4C:
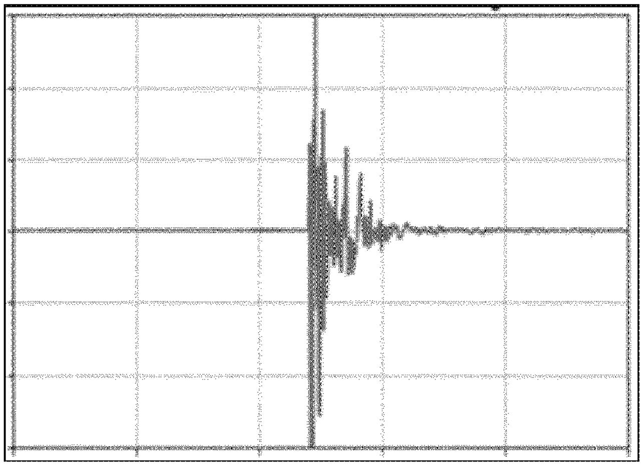

FIG. 4*c* illustrates an example movement data of a second known movement of the door linked to a second known event. According to some embodiments the movement data of the second known movement of the door comprising an acceleration over time function. In the example illustration in FIG. 4*c* the known event is collision detection when the door 1 is hit by a ball.

According to some embodiments multiple known movements indicative of movements of the door 1 linked to multiple known events are stored in the memory 101*a*, 101*b*, 101*c*.

FIGS. 4*b* and 4*c* are for illustrative purpose and it is understood that multiple known movements of the door linked to a plural known events can be stored in the memory 101*a*, 101*b*, 101*c* and utilized by the movement-to-event model to determine a probable event that caused the movement of the door 1.

In a use case example, with reference to FIGS. 4*a*-4*c*, the movement-to-event model is analyzing the movement of the door 1 during a predefined time period based on the obtained movement data. The movement of the door 1 during the predefined time period is illustrated as in FIG. 4*a*. The movement-to-event model is used for determining a probable event that caused the movement of the door based on existing known movements of the door 1 linked to known events. Two known movements of the door 1 linked to known events are illustrated in FIG. 4*b*, when the door 1 is hit by a truck, and in FIG. 4*c*, when the door 1 is hit by a ball. In the example the probable event that caused the movement of the door 1 as illustrated in FIG. 4*a* is determined using the movement-to-event to be that a the door has been hit by a truck, as illustrated in FIG. 4*b*, and not that the door has been hit by a ball as illustrated in FIG. 4*c*. It is understood that the processing circuitry 102*a*, 102*b*, 102*c* is configured to do a more precise determination but for illustrative purpose, the FIGS. 4*a*-4*c*, illustrates for the human eye one principle of how the movement-to-event model can determine a probable event that caused the movement of the door 1.

An advantage with this embodiment is that the movement-to-event model is used to analyze and compare the obtained movement data indicative of the movement of the door 1, with plural known movement data indicative of a movements of doors that are linked to known events, in order to determine the probable event that caused the movement of the door.

According to some embodiments the processing circuitry 102*a*, 102*b*, 102*c* is further configured to determine a movement pattern describing the movement of the door 1 during the predefined time period and wherein the movement-to-event model is comparing the determined movement pattern describing the movement of the door 1 with known movement patterns describing different movements of the door 1 caused by known events.

According to some embodiments the movement pattern is based on the obtained movement data indicative of a movement of the door 1.

According to some embodiments the movement pattern is a pattern indicative of a movement in at least a first direction x, y, z in relation to the door 1, over time. In an example the movement pattern is four dimensional, indicative of a movement of the door 1 in a first direction x, a second direction y and third directions, over time.

According to some embodiments known movement patterns are stored in the memory 101*a*, 101*b*, 101*c*.

According to some embodiments the movement-to-event model is utilizing known movement patterns to determine a probable event that caused the movement of the door 1.

According to some embodiments the movement-to-event model is comparing the obtained movement pattern with stored known movement patterns, to determine a probable event that caused the movement of the door 1.

An advantage with this embodiment is that the movement-to-event model can be used to analyze and compare the movement pattern describing the movement of the door with plural known movement patterns that are linked to known events, in order to determine the probable event that caused the movement pattern of the door.

According to some embodiments the processing circuitry 102*a*, 102*b*, 102*c* is further configured to, cause the system 100 to control operation of the door 1 based on the probable event that caused the movement of the door 1. According to some embodiments the operation of the door 1 is dependent on the probable event that caused the movement of the door 1. According to some embodiments the operation of the door 1 is at least any of opening the door 1, closing the door 1, holding the door, slowing down the speed of the door 1, increasing the speed of the door 1, locking the door 1 and unlocking the door 1.

An advantage with this embodiment is that the door can be operated in different ways dependent on what probable event that has occurred in order to maintain safety and reduce possible damage of the door.

According to some embodiments the processing circuitry 102*a*, 102*b*, 102*c* is further configured to, cause the system 100 to generate and send a notification message to an electronic device based on the probable event that caused the movement of the door 1. According to some embodiments the notification message is indicative of the probable event that caused the movement of the door 1. According to some embodiments the notification message is any of a visual, tactile or sound notification. In an example a service technician can receive a message via a user interface of the portable electronic device, e.g. a smartphone, indicative of the probable event that caused the movement of the door 1.

According to some embodiments the processing circuitry 102*a*, 102*b*, 102*c* is further configured to, cause the system 100 to determine a position of the door 1 when the probable event that caused the movement of the door 1 occurred.

An advantage with this embodiment is that it can be determined what may have caused the movement of the door 1 and to determine possible damage of the door 1. FIG. 2*a* illustrates an example of a collision detection when the door is hit by a truck when the door 1 was between closed and fully opened position. In the example, with the knowledge of the position of the door 1, it can be determined what parts of the door 1 that may be damaged and that needs service and what parts that may not be damaged and not need service.

According to some embodiments the movement of the door 1 during the predefined time period is described by a function describing a movement amplitude in at least a first direction x, y, z in relation to the door 1 over time. FIGS. 4*a*-4*c* illustrate example functions that are describing a movement amplitude in a first direction in relation to the door 1 over time. According to some embodiments the movement amplitude is determined by an acceleration of the door in a direction to describe the movement of the door 1.

According to some embodiments the movement amplitude is determined by a distance the door 1 is moving to describe the movement of the door 1.

An advantage with this embodiment is that the function describing the movement amplitude can be utilized by the movement-to-event model to determine a probable event that caused the movement of the door.

According to some embodiments an impact movement energy, causing the movement of the door 1 during the predefined time period, is determined by calculating the surface area under the function describing the movement amplitude in the at least first direction x, y, z in relation to the door 1 over time.

Figure 5A:
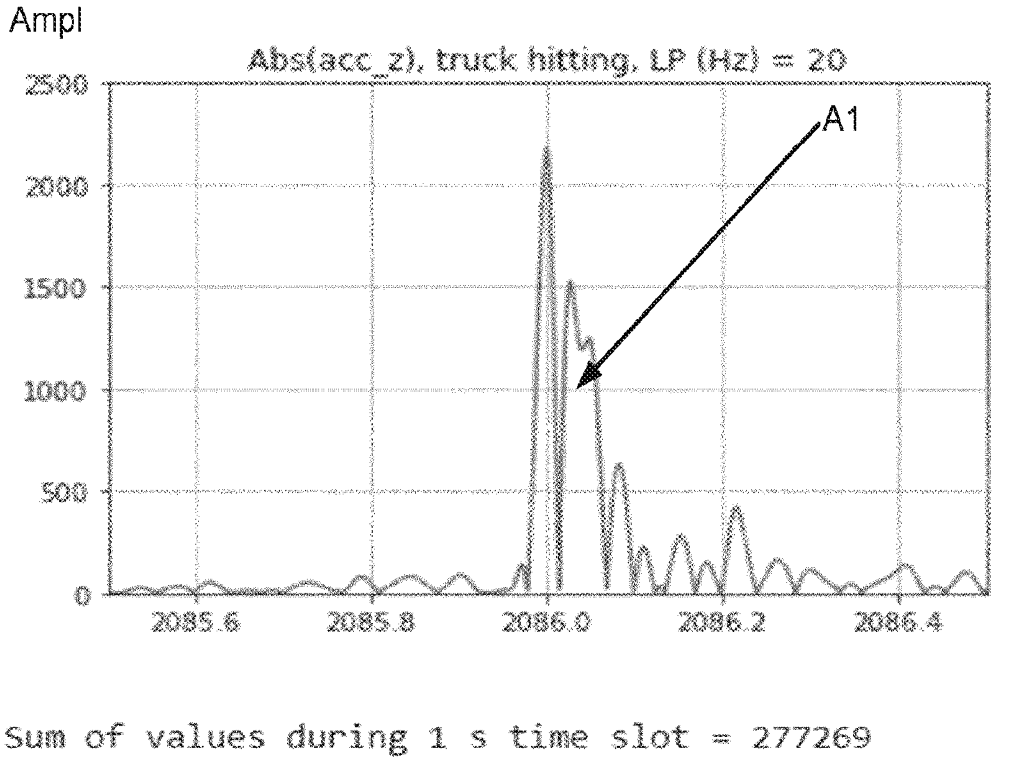
Figure 5B:
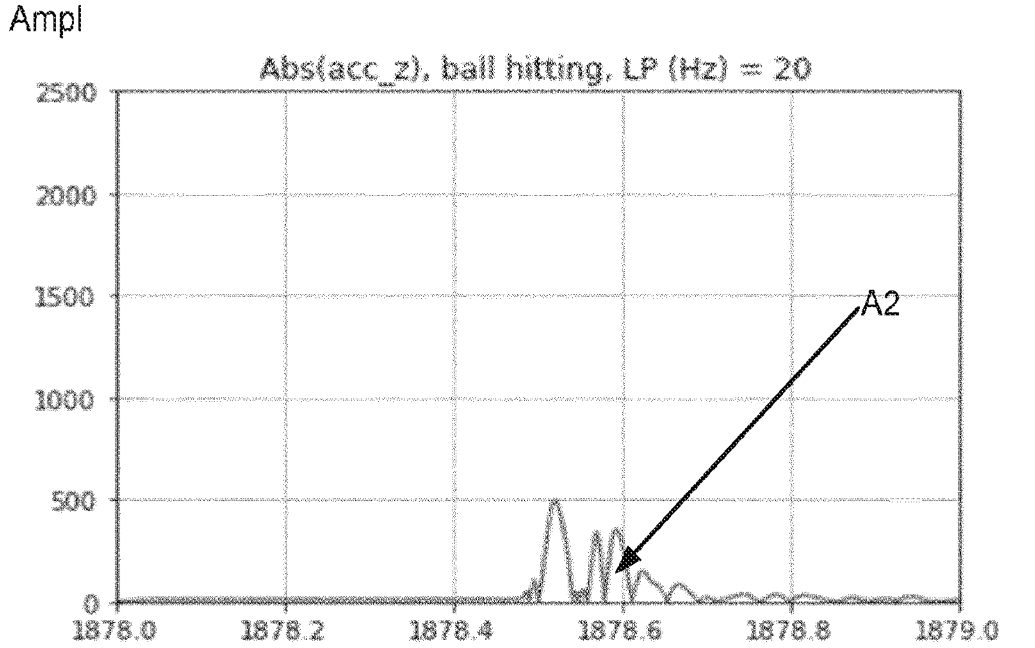
Figure 6:
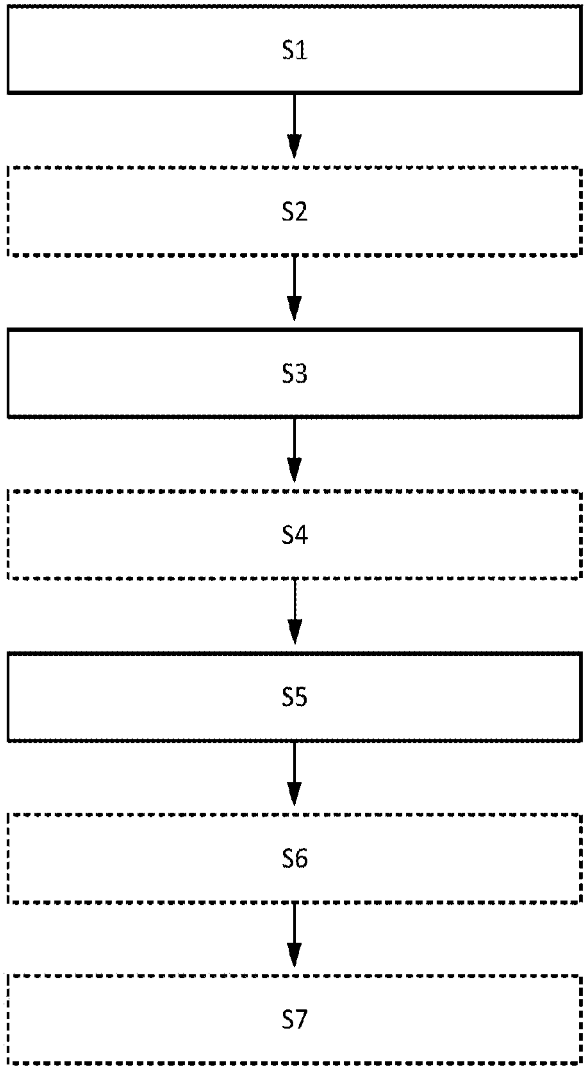
FIG. 6 illustrates a flow chart of the method steps according to the second aspect of the disclosure.
Figure 7:
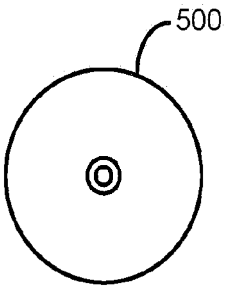
FIG. 7 illustrates a computer program product according to the third aspect of the disclosure.

FIGS. 5*a* and 5*b* illustrate example functions that are describing an absolute movement amplitude, Ampl, in a first direction in relation to the door 1 over time. According to some embodiments the movement amplitude is determined by an acceleration of the door in a direction to describe the movement of the door 1. According to some embodiments the movement amplitude is determined by a distance the door 1 is moving to describe the movement of the door 1.

FIG. 5*a* illustrates a first example impact movement energy, causing the movement of the door. FIG. 5*a* illustrates a first example impact movement energy, causing the movement of the door, determined by a first surface area A1 under the function describing the movement amplitude in the at least first direction.

FIG. 5*b* illustrates a second example impact movement energy, causing the movement of the door. FIG. 5*b* illustrates a second example impact movement energy, causing the movement of the door, determined by a second surface area A2 under the function describing the movement amplitude in the at least first direction.

According to some embodiments the impact movement energy is utilized by the movement-to-event model to determine a probable event that caused the movement of the door 1.

An advantage with this embodiment is that the determined impact movement energy can be utilized by the movement-to-event model to determine a probable event that caused the movement of the door.

According to some embodiments the movement-to-event model is trained based on historical event data and/or user input data by using artificial intelligence models and/or statistical models.

According to some embodiments the system 100 is configured to obtain historical event data from other systems configured for collision and intrusion detection of doors.

According to some embodiments the movement-to-event model is trained by user input data confirming certain event linked to certain movement of the door 1.

According to some embodiments the system is using artificial intelligence models and/or statistical models to automatically improve predictions and decisions of the movement-to-event model. An advantage with this embodiment is that the movement-to-event model can be improved over time in order to improve the determination of the probable event that caused the movement of the door.

According to some embodiments the movement-to-event model utilizes at least any of signal processing and image processing to determine a probable event that caused the movement of the door 1.

According to some embodiments the movement-to-event model utilizes distributed processing with multiple processing circuitries 102*a*, 102*b*, 102*c*, to determine a probable event that caused the movement of the door 1.

According to some embodiments, the system further comprises a motor 40*a*, 40*b* arranged at the door configured to control operation of the door. In the example illustration of FIG. 1 two motors are arranged at different corners of the door 1, that is an overhead sectional door. The movement motors 40*a*, 40*b* can however be arranged anywhere at the door 1.

According to some embodiments the system comprises a motor 40*a*, 40*b* arranged in the vicinity of the movement sensor 10*a*, 10*b*.

According to some embodiments the movement sensor 10*a*, 10*b* is further configured to detect movement and/or vibration of the door 1 caused by frequencies generated by the motor 40*a*, 40*b*, and in accordance with a determination of a probable event, the processing circuitry 102*a*, 102*b*, 102*c* is further configured to determine a change in the amplitude of the frequencies generated by the motor 40*a*, 40*b* to predict maintenance of the door 1.

An advantage with this embodiment is that in a determination of a probable event it can be further determined if the operation of the motor has changed, which can be an indication of that maintenance of the door is needed or not needed dependent on the determination of change in the amplitude of the frequencies generated by the motor after the probable event has occurred.

According to some embodiments the processing circuitry 102*a*, 102*b*, 102*c* is further configured to, cause the system 100 to generate and send a maintenance notification message to an electronic device based on the probable event that caused the movement and/or vibration of the door 1. According to some embodiments the maintenance notification message is indicative of what maintenance that is needed based on the determination of change in the amplitude of the frequencies generated by the motor after the probable event has occurred. According to some embodiments the maintenance notification message is any of a visual, tactile or sound notification. In an example a service technician can receive a message via a user interface of the portable electronic device, e.g. a smartphone, indicative of the maintenance that is needed.

The second aspect of this disclosure shows a method for collision and intrusion detection of a door 1. The method comprising the step of S1 obtaining, by the movement sensor 10*a*, 10*b*, movement data indicative of a movement of the door 1, the step of S3 analyzing the movement of the door 1 during a predefined time period based on the obtained movement data, and the step of S5 utilizing a movement-to-event model to determine a probable event that caused the movement of the door 1.

An advantage with this aspect is that by analyzing the movement of the door, a probable event causing the movement can be determined, and the information regarding the probable event can in turn be used to take actions that relates to the operation of the door in order to secure operation and protect the door.

According to some embodiments the method further comprises the step of S2 determining, if the movement of the door 1 is above a predefined threshold value based on the obtained movement data.

An advantage with this aspect is that if the movement of the door is below a predefined threshold value, the movement of the door is ignored.

According to some embodiments the method further comprises the step of S4 determining a movement pattern describing the movement of the door 1 during the predefined time period and wherein the movement-to-event model is comparing the determined movement pattern describing the movement of the door 1 with known movement patterns describing different movements of the door 1 caused by known events.

An advantage with this embodiment is that the movement-to-event model can be used to analyze and compare the movement pattern describing the movement of the door with plural known movement patterns that are linked to known events, in order to determine the probable event that caused the movement pattern of the door.

According to some embodiments the method further comprises the step of S6 controlling operation of the door 1 based on the probable event that caused the movement of the door 1.

An advantage with this embodiment is that the door 1 can be operated in different ways dependent on what probable event that has occurred in order to maintain safety and reduce possible damage of the door 1.

According to some embodiments the method further comprises the step of S7 determining a position of the door 1 when the probable event that caused the movement of the door 1 occurred.

An advantage with this embodiment is that it can be determined what may have caused the movement of the door and to determine possible damage of the door 1.

The third aspect of this disclosure shows a computer program product the second aspect comprising a non-transitory computer readable medium, having thereon a computer program comprising program instructions, the computer program being loadable into a processing circuitry 102*a*, 102*b*, 102*c* and configured to cause execution of the method when the computer program is run by the at least one processing circuitry 102*a*, 102*b*, 102*c*.

The person skilled in the art realizes that the present disclosure is not limited to the preferred embodiments described above. The person skilled in the art further realizes that modifications and variations are possible within the scope of the appended claims.

Additionally, variations to the disclosed embodiments can be understood and effected by the skilled person in practicing the claimed disclosure, from a study of the drawings, the disclosure, and the appended claims.

The invention claimed is:

1. A system for collision and intrusion detection of a door, the system comprises:
- a movement sensor configured to be arranged at the door to detect movement of the door;
- a processing circuitry, configured to cause the system to:
  - obtain, by the movement sensor, movement data indicative of a movement of the door;
  - analyze the movement of the door during a predefined time period based on the obtained movement data; and
  - utilize a movement-to-event model to determine a probable event that caused the movement of the door, and wherein the system further comprises:
- a motor arranged in the vicinity of the movement sensor, and the movement sensor is further configured to detect movement and/or vibration of the door caused by frequencies generated by the motor, and in accordance with a determination of a probable event, the processing circuitry is further configured to:
  - determine a change in the amplitude of the frequencies generated by the motor to predict maintenance of the door.

2. The system according to claim 1, wherein the movement-to-event model is based on known movements of the door linked to known events.

3. The system according to claim 1, wherein the processing circuitry is further configured to:
- determine a movement pattern describing the movement of the door during the predefined time period and wherein the movement-to-event model is comparing the determined movement pattern describing the movement of the door with known movement patterns describing different movements of the door caused by known events.

4. The system according to claim 1, wherein the processing circuitry is further configured to, cause the system to: control operation of the door based on the probable event that caused the movement of the door.

5. A system for collision and intrusion detection of a door, the system comprises:
- a movement sensor configured to be arranged at the door to detect movement of the door;
- a processing circuitry, configured to cause the system to:
- obtain, by the movement sensor, movement data indicative of a movement of the door;
- analyze the movement of the door during a predefined time period based on the obtained movement data; and
- utilize a movement-to-event model to determine a probable event that caused the movement of the door, and wherein the system further comprises:
- a motor arranged in the vicinity of the movement sensor,
- and the movement sensor is further configured to detect movement and/or vibration of the door caused by frequencies generated by the motor, and in accordance with a determination of a probable event, the processing circuitry is further configured to:
  - determine a change in the amplitude of the frequencies generated by the motor to predict maintenance of the door,
- wherein the processing circuitry is further configured to cause the system to:
  - determine a position of the door between a closed and a fully opened position when the probable event that caused the movement of the door occurred.

6. The system according to claim 1, wherein the movement data indicative of a movement of the door is indicative of a movement in at least a first direction in relation to the door.

7. The system according to claim 1, wherein the movement of the door during the predefined time period is described by a function describing a movement amplitude in at least a first direction in relation to the door over time.

8. The system according to according to claim 1, wherein an impact movement energy, causing the movement of the door during the predefined time period, is determined by calculating the surface area under the function describing the movement amplitude in the at least first direction in relation to the door over time.

9. The system according to claim 1, wherein the movement-to-event model is trained based on historical event data and/or user input data by using artificial intelligence models and/or statistical models.

10. A method for collision and intrusion detection of a door, wherein the door comprises a motor arranged in the vicinity of a movement sensor, the method comprising:
- obtaining, by the movement sensor, movement data indicative of a movement of the door;
- analyzing the movement of the door during a predefined time period based on the obtained movement data; and
- utilizing a movement-to-event model to determine a probable event that caused the movement of the door detecting movement and/or vibration of the door caused by frequencies generated by the motor, and in accordance with the determination of the probable event, and determining a change in the amplitude of the frequencies generated by the motor to predict maintenance of the door.

11. The method according to claim 10, the method further comprising:

determining a movement pattern describing the movement of the door during the predefined time period and wherein the movement-to-event model is comparing the determined movement pattern describing the movement of the door with known movement patterns describing different movements of the door caused by known events.

12. The method according to claim 10, the method further comprising:

controlling operation of the door based on the probable event that caused the movement of the door.

13. The method according to claim 10, the method further comprising:

determining a position of the door when the probable event that caused the movement of the door occurred.

14. A computer program product comprising a non-transitory computer readable medium, having thereon a computer program comprising program instructions, the computer program being loadable into a processing circuitry and configured to cause execution of the method according to claim 10 when the computer program is run by the at least one processing circuitry.

* * * * *